US009076235B2

(12) United States Patent
Abe

(10) Patent No.: US 9,076,235 B2
(45) Date of Patent: Jul. 7, 2015

(54) IMAGE PROCESSING METHOD, IMAGE PROCESSING APPARATUS, AND NON-TRANSITORY COMPUTER-READABLE MEDIUM

(71) Applicant: CANON KABUSHIKI KAISHA, Tokyo (JP)

(72) Inventor: Noboru Abe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/051,955

(22) Filed: Oct. 11, 2013

(65) Prior Publication Data

US 2014/0118752 A1   May 1, 2014

(30) Foreign Application Priority Data

Oct. 29, 2012   (JP) ................................. 2012-238358

(51) Int. Cl.
*H04N 1/40* (2006.01)
*G06T 3/40* (2006.01)
(52) U.S. Cl.
CPC .......... *G06T 3/4053* (2013.01); *H04N 1/40068* (2013.01)
(58) Field of Classification Search
None
See application file for complete search history.

(56) References Cited

U.S. PATENT DOCUMENTS

| 6,993,208 | B2* | 1/2006 | Matsumoto | 382/298 |
| 8,482,627 | B2* | 7/2013 | Sekine | 348/222.1 |
| 2003/0122825 | A1* | 7/2003 | Kawamoto | 345/428 |
| 2004/0246347 | A1* | 12/2004 | Nokita | 348/222.1 |
| 2005/0024391 | A1* | 2/2005 | Damera-Venkata et al. | 345/698 |
| 2008/0267494 | A1* | 10/2008 | Cohen et al. | 382/166 |
| 2010/0091147 | A1* | 4/2010 | Nomura et al. | 348/279 |
| 2012/0033728 | A1* | 2/2012 | Cho et al. | 375/240.03 |

FOREIGN PATENT DOCUMENTS

| JP | 04-336859 A | 11/1992 |
| JP | 2004-201283 A | 7/2004 |

* cited by examiner

*Primary Examiner* — Ashish K Thomas
(74) *Attorney, Agent, or Firm* — Carter, DeLuca, Farrell & Schmidt, LLP

(57) ABSTRACT

An image processing apparatus which generates, from first image data having a first resolution, second image data having a second resolution lower than the first resolution, comprises: a determination unit configured to determine a pixel of interest in the first image data based on the first resolution and the second resolution; a selection unit configured to select one of a plurality of filters in accordance with a position of the pixel of interest in the first image data that has been determined by the determination unit; and a generation unit configured to generate second image data having the second resolution by performing filter processing for a region including the pixel of interest by using the filter selected by the selection unit.

10 Claims, 10 Drawing Sheets

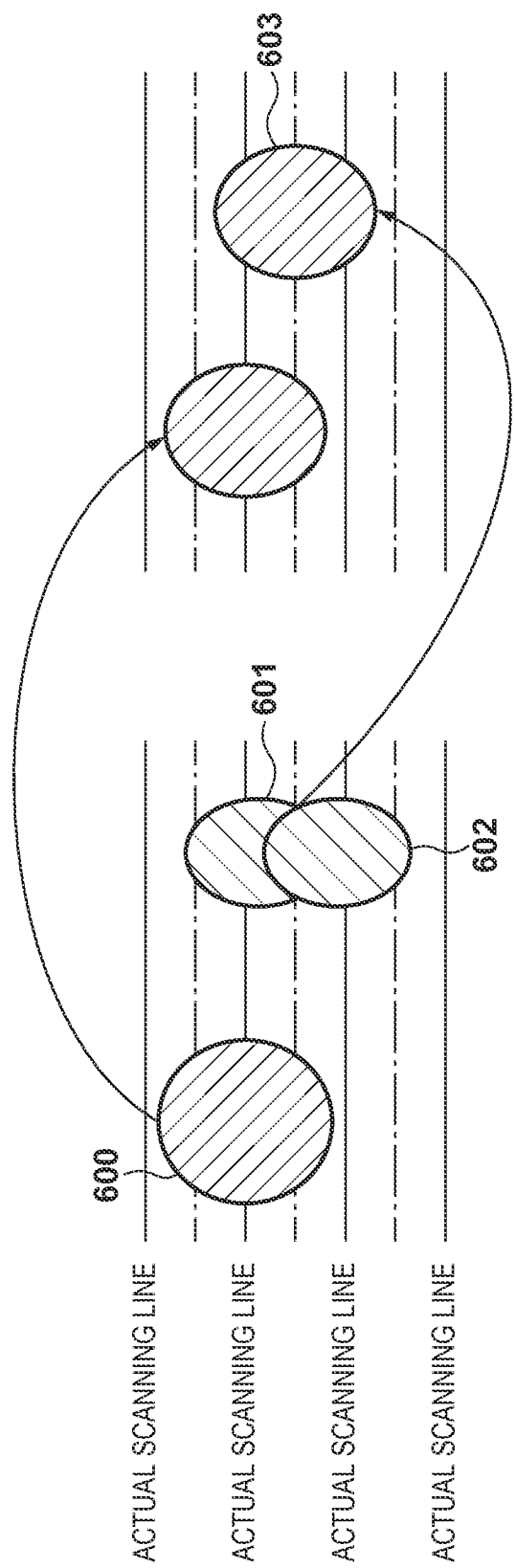

F I G. 10A

| 5 | 10 | 0 |

F I G. 10B

| 0 | 10 | 5 |

F I G. 11

| 0.67 | 0.67 | 0.67 | 0.67 | 0.67 | 0.67 | 0.67 | 0.67 | 0.67 | 0.67 | ~1100 |
| 0 | 0 | 0 | 0 | 0 | 0 | 0 | 0 | 0 | 0 | |
| 0 | 0 | 0 | 0 | 0 | 0 | 0 | 0 | 0 | 0 | |
| 0.33 | 0.33 | 0.33 | 0.33 | 0.33 | 0.33 | 0.33 | 0.33 | 0.33 | 0.33 | |
| 0.33 | 0.33 | 0.33 | 0.33 | 0.33 | 0.33 | 0.33 | 0.33 | 0.33 | 0.33 | |
| 0 | 0 | 0 | 0 | 0 | 0 | 0 | 0 | 0 | 0 | |
| 0 | 0 | 0 | 0 | 0 | 0 | 0 | 0 | 0 | 0 | |
| 0 | 0 | 0 | 0 | 0 | 0 | 0 | 0 | 0 | 0 | |

FIG. 13A

| 1 | 2 | 0 |
|---|---|---|
| 2 | 4 | 0 |
| 0 | 0 | 0 |

FIG. 13B

| 0 | 2 | 1 |
|---|---|---|
| 0 | 4 | 2 |
| 0 | 0 | 0 |

FIG. 13C

| 0 | 0 | 0 |
|---|---|---|
| 2 | 4 | 0 |
| 1 | 2 | 0 |

FIG. 13D

| 0 | 0 | 0 |
|---|---|---|
| 0 | 4 | 2 |
| 0 | 2 | 1 |

IMAGE PROCESSING METHOD, IMAGE PROCESSING APPARATUS, AND NON-TRANSITORY COMPUTER-READABLE MEDIUM

BACKGROUND OF THE INVENTION

1. Field of the Invention

The present invention relates to an image processing method and image processing apparatus for converting the resolution of an image, and a non-transitory computer-readable medium.

2. Description of the Related Art

For image processing apparatuses such as a printer and MFP (Multi Function Peripheral), there is proposed an arrangement in which a high-resolution image signal is converted into low-resolution image data to output an image at a high definition. For example, there is proposed an arrangement in which a low-resolution printer outputs each pixel of high-resolution bitmap data by using a spot multiplexing technique (see Japanese Patent Laid-Open No. 04-336859). This technique has a feature in which, for example, even a 600-dpi printer can express an image quality equivalent to 1,200 dpi.

There is also proposed an arrangement in which the resolution of a portion where high-resolution data needs to be rasterized in a controller is converted into low-resolution data to suppress the loads on a printer and controller and obtain a high-definition image quality (see Japanese Patent Laid-Open No. 2004-201283). In this case, the first image data having the first resolution N is converted into the second image data having the second resolution M lower than the first resolution, and the second image data is output.

In the above-mentioned arrangement, when performing resolution conversion from the first image data having the first resolution N into the second image data having the second resolution M, the resolution conversion ratio N/M needs to be an integral multiple. For example, assume that the resolution N is 1,200 dpi, and the resolution M is 600 dpi. In this case, the resolution conversion ratio N/M is 1200/600=2, which is an integral multiple.

SUMMARY OF THE INVENTION

In resolution conversion, the resolution conversion ratio is sometimes not an integral multiple. For example, assume that the resolution N is 600 dpi, and the resolution M is 400 dpi. In this case, the resolution conversion ratio N/M becomes 1.5, which is not an integral multiple. If resolution conversion is performed in the aforementioned arrangement, sampling cannot be executed at an integral ratio, and an accurate output equivalent to 600 dpi cannot be obtained in outputting each pixel from the printer. For example, when 1-dot lines are rendered at equal intervals in the first image data, the barycenter in rendering in the second image data after resolution conversion is biased, losing the equal intervals between 1-dot lines and their line width uniformity.

According to one aspect of the present invention, there is provided an image processing apparatus which generates, from first image data having a first resolution, second image data having a second resolution lower than the first resolution, comprising: a determination unit configured to determine a pixel of interest in the first image data based on the first resolution and the second resolution; a selection unit configured to select one of a plurality of filters in accordance with a position of the pixel of interest in the first image data that has been determined by the determination unit; and a generation unit configured to generate second image data having the second resolution by performing filter processing for a region including the pixel of interest by using the filter selected by the selection unit.

According to another aspect of the present invention, there is provided an image processing method of generating, from first image data having a first resolution, second image data having a second resolution lower than the first resolution, comprising: a determination step of determining a pixel of interest in the first image data based on the first resolution and the second resolution; a selection step of selecting one of a plurality of filters in accordance with a position of the pixel of interest in the first image data that has been determined in the determination step; and a generation step of generating second image data having the second resolution by performing filter processing for a region including the pixel of interest by using the filter selected in the selection step.

According to another aspect of the present invention, there is provided a non-transitory computer-readable medium storing a program for causing a computer for generating, from first image data having a first resolution, second image data having a second resolution lower than the first resolution, to function as a determination unit configured to determine a pixel of interest in the first image data based on the first resolution and the second resolution, a selection unit configured to select one of a plurality of filters in accordance with a position of the pixel of interest in the first image data that has been determined by the determination unit, and a generation unit configured to generate second image data having the second resolution by performing filter processing for a region including the pixel of interest by using the filter selected by the selection unit.

According to the present invention, even when the resolution conversion ratio N/M of the resolution N before conversion and the resolution M after conversion is not an integral multiple, high-definition image data can be output.

Further features of the present invention will become apparent from the following description of exemplary embodiments (with reference to the attached drawings).

BRIEF DESCRIPTION OF THE DRAWINGS

FIGS. 5A and 5B are views exemplifying resolution conversion processing filters in the sub-scanning direction;

FIG. 6 is a view showing the concept of sub-dot formation by exposure overlay;

FIGS. 10A and 10B are views exemplifying resolution conversion processing filters in the main-scanning direction;

FIG. 11 is a view showing an example in which output multilevel image data is expressed by numerical values and normalized by setting "1" as a maximum value;

FIGS. 13A, 13B, 13C, and 13D are views exemplifying resolution conversion processing filters in the main- and sub-scanning directions.

DESCRIPTION OF THE EMBODIMENTS

Embodiments of the present invention will now be described with reference to the accompanying drawings.

[Apparatus Arrangement]

Figure 1:
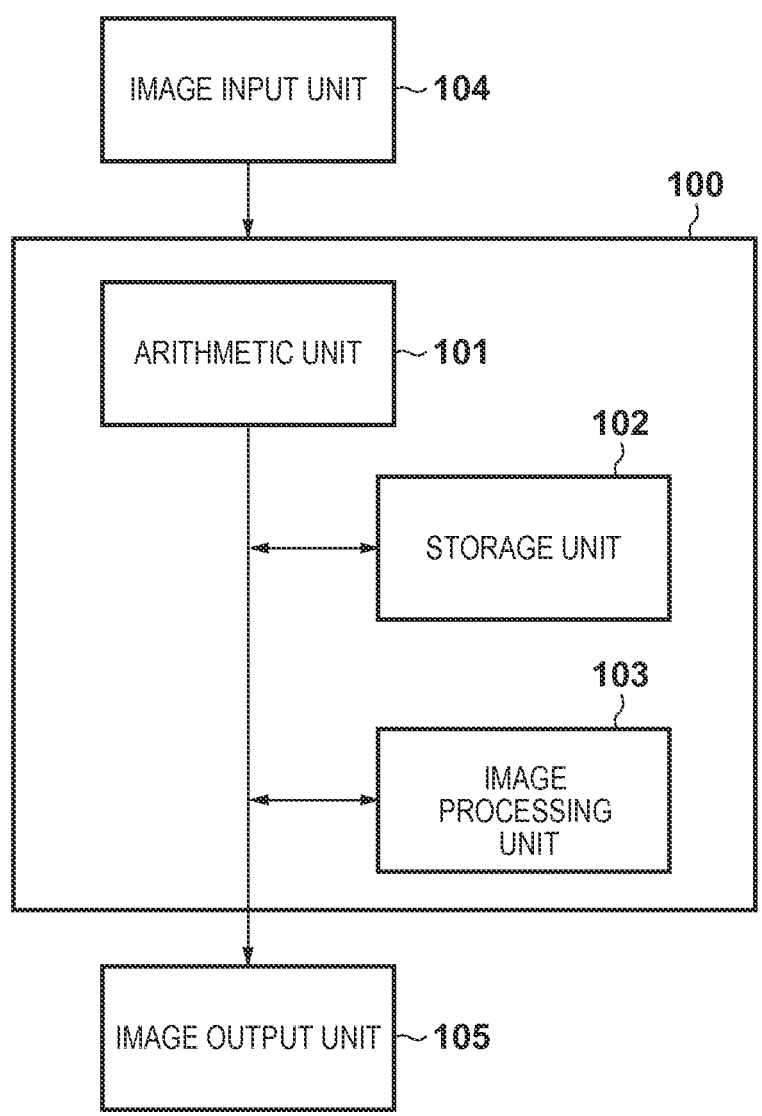
FIG. 1 is a block diagram showing the conceptual arrangement of a control system in an image processing apparatus.

FIG. 1 is a block diagram showing the conceptual arrangement of a control system in an image processing apparatus according to an embodiment of the present invention. In FIG. 1, a control unit 100 is a control unit for controlling the overall image processing apparatus. The control unit 100 includes an arithmetic unit 101 which executes various processing operations such as calculation, control, and discrimination, a storage unit 102 which stores a resolution conversion processing program and resolution conversion filter according to the embodiment and the like, and an image processing unit 103 which executes resolution conversion processing according to the present invention.

Image data to undergo resolution conversion processing is input from an image input unit 104 to the control unit 100. In an embodiment of the present invention, a unit for acquiring image data by the image processing apparatus is not particularly limited. For example, image data created by the user on a predetermined application may be acquired from the image input unit 104. When the image processing apparatus includes a detachable medium reading apparatus such as an optical disk or USB storage device, image data may be input via the medium. Further, when the image processing apparatus is connected via a network (not shown), image data may be acquired from the image input unit 104 via the network.

Image data having undergone image processing by the control unit 100 is transferred to an image output unit 105. In an embodiment of the present invention, the control unit 100 may be installed in an MFP or printer side, or in a PC (not shown) connected to the MFP or printer via a network, USB cable, or the like.

First Embodiment

The first embodiment assumes that the first resolution N as a resolution before resolution conversion is 600 dpi in the main-scanning direction and 600 dpi in the sub-scanning direction. Also, assume that the second resolution M as a resolution after resolution conversion is 600 dpi in the main-scanning direction and 400 dpi in the sub-scanning direction (to be referred to as 600×400 dpi hereinafter). N and M are integers. That is, the resolution conversion ratio before and after resolution conversion processing is not an integral multiple. Further, assume that both the first and second image data are monochrome image data. The first embodiment assumes that the first image data is binary image data having undergone dither processing, and the second image data is 8-bit multilevel image data. The first and second image data are monochrome image data in the first embodiment, but may be color image data.

The first embodiment will explain an example in which only the resolution in the sub-scanning direction is converted without converting the resolution in the main-scanning direction (resolution conversion from 600 dpi to 400 dpi in the sub-scanning direction). Substantially, two of every three lines are sampled from the first image in the sub-scanning direction, and the number of pixels of the second image data in the sub-scanning direction becomes ⅔ of the first image data. However, in the embodiment, one pixel is not simply thinned out from three pixels.

[Resolution Conversion Processing]

Figures 4A, 4B, 4C:
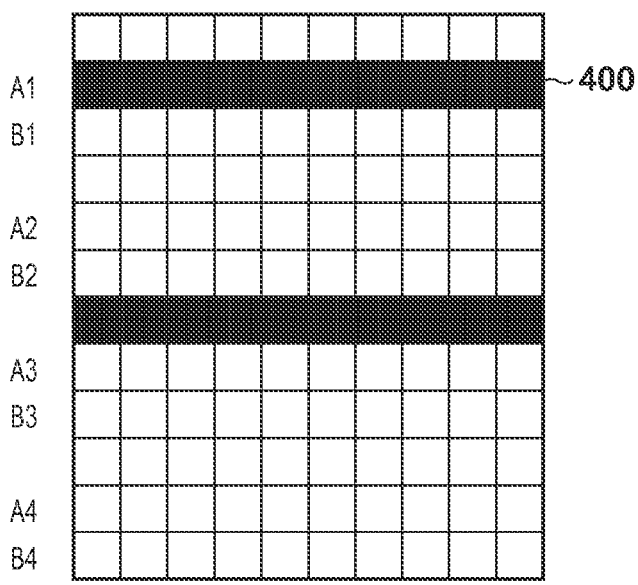
FIGS. 4A, 4B, and 4C are views for explaining input binary image data and output multilevel image data.
Figure 7:
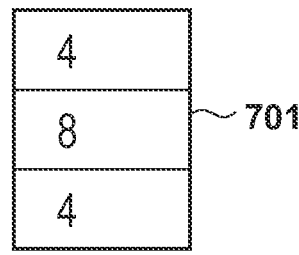
FIG. 7 is a view exemplifying a resolution conversion filter used in conventional resolution conversion processing.

FIGS. 4A to 4C are views for conceptually explaining resolution conversion processing of converting the first image data into the second image data. FIG. 4A partially enlarges the first image data having the first resolution N. FIG. 4B shows the pixel value of FIG. 4A. FIG. 4C shows the second image data obtained by performing resolution conversion processing according to the embodiment for the first image data. The second image data is 8-bit multilevel image data, as described above, and an output value is clipped by setting a minimum value of 0 and a maximum value of 255.

Reference symbols A1 to A3 and B1 to B3 in the sub-scanning direction in FIG. 4A are lines (to be referred to as lines A1 to A3 and B1 to B3 hereinafter) to be sampled from the first image data when performing resolution conversion processing. In the embodiment, two of every three lines are sampled, as described above. A line not to be sampled is adjacent to the line A above it. In contrast, a line not to be sampled is adjacent to the line B below it. That is, the lines A and B have different positional relationships with a line not to be sampled.

The embodiment adopts a plurality of resolution conversion filters for performing resolution conversion processing. FIGS. 5A and 5B exemplify resolution conversion filters. FIG. 5A shows an example in which a resolution conversion filter (to be referred to as a filter A hereinafter) to be used for pixels of interest on the lines A1 to A3 is defined. FIG. 5B shows an example in which a resolution conversion filter (to be referred to as a filter B hereinafter) to be used for pixels of interest on the lines B1 to B3 is defined. A value in the filter represents a weight coefficient (to be referred to as a filter coefficient hereinafter) for a pixel value. A filter coefficient at the center position of a filter is used to correspond to a pixel of interest.

The first image data is binary image data. Each black portion in FIG. 4A is set to be 1, and each white portion is set to be 0. Then, a product-sum operation based on the filter is executed for all pixels on the lines A1 to A3 and B1 to B3. In image data, i represents a coordinate in the main-scanning direction, and j represents a coordinate in the sub-scanning direction. Letting $x(i, j)$ be the value of a pixel of interest on the line A in the first image data, the operation result of filter processing using the filter A is given by $$OUT=(5*x(i,j-1))+(10*x(i,j))+(0*x(i,j+1))$$

where "*" is the product. The range of pixels to undergo the product-sum operation is determined in accordance with the filter size.

An output value is obtained by clipping the operation result to an 8-bit output (maximum value: 255) at the ratio of the sum of filter coefficients. The sum of filter coefficients of the filter A is 15 (=5+10+0). The value is the same for the filter B. In the first embodiment, the output value takes four values: 0 (=255*0/15), 85 (=255*5/15), 170 (=255*10/15), and 255 (=255*15/15). This processing will be described as "an output value is clipped".

[Dot Formation]

FIG. 6 shows a principle of forming a sub-dot between dots by overlay of laser exposure. Exposure of a half-dot is overlaid on upper and lower pixels 601 and 602 on actual scanning lines indicated by solid lines, thereby forming a dot 603 between the actual scanning lines. The embodiment utilizes this principle.

In FIG. 4C showing the second image data in the first embodiment, the first line from the top exhibits an output value of 170. In FIG. 4C, pixels having an output value of 85 are aligned on the fourth and fifth lines from the top. In a printout, dots are formed between actual scanning lines corresponding to these pixels, thereby interpolating pixels and implementing a 600-dpi resolution.

The exposure amount of laser exposure can be adjusted by PWM (Pulse Width Modulation) control in an image output unit 105. The output value of the second image data represents the ratio of the engine resolution and PWM pulse width. More specifically, an output value of 255 indicates full exposure of one pixel by a 600×400-resolution engine. An output value of 85 indicates exposure at a ⅓ width, and along with this, the exposure amount becomes ⅓. That is, by determining the filter coefficient of the resolution conversion filter, an exposure amount using PWM control is also determined.

However, in electrophotography, a dot to be actually printed does not linearly greatly change even by increasing the PWM pulse width owing to overlay of laser exposure and gathering of potential peaks. Ideally, the filter coefficient and PWM pulse width are linearly clipped, as described above. However, the coefficient may be arbitrarily adjusted in accordance with the engine characteristic and output result of the printer.

The value of the filter coefficient needs to be set so that the ratio of a filter coefficient regarding the value of a sampling point (pixel) and the sum of filter coefficients forming one resolution conversion filter becomes equal to the inverse number M/N of the resolution conversion ratio N/M. Further, the value of the filter coefficient needs to be set so that the ratio of the sum of filter coefficients regarding the value of a non-sampling point (pixel) and the sum of filter coefficients forming one resolution conversion filter becomes equal to the inverse number M/N of the resolution conversion ratio N/M.

Note that the embodiment uses a plurality of resolution conversion filters (filters A and B). The sum of filter coefficients regarding the value of a non-sampling point (pixel) is the sum of filter coefficients of a plurality of resolution conversion filters regarding the non-sampling pixel.

The filter coefficient of the resolution conversion filter is defined in the above-described way because the PWM intensity needs to be weakened in accordance with the resolution conversion ratio in order to convert a resolution of 600 dpi into a resolution of 400 dpi in the sub-scanning direction. In the first embodiment, the inverse number M/N of the resolution conversion ratio N/M is 400/600=⅔.

The filter coefficients in the first embodiment shown in FIG. 5 will be exemplified. A filter coefficient regarding the value of a sampling point (pixel) is "10" which is a filter coefficient regarding pixels of interest in the filters A and B. The sum of filter coefficients regarding the value of a non-sampling point (pixel) is the sum of "5" in the filter A and "5" in the filter B which are filter coefficients regarding a pixel (non-sampling point) to be interpolated. More specifically, a line (seventh line from the top) interposed between the lines B2 and A3 from above and below in FIG. 4A is formed from non-sampling points in the first embodiment. When the resolution conversion filters are applied to, as pixels of interest, two points (sampling points on the lines B2 and A3) sandwiching the non-sampling point from above and below, each filter coefficient of 5 is applied to the non-sampling point. As a result, the sum becomes 10 (=5+5).

Since the sum of these filter coefficients is 15, the ratio of a filter coefficient regarding the value of a sampling point (pixel) and the sum of filter coefficients becomes 10/15=⅔. The ratio of the sum of filter coefficients regarding the value of a non-sampling point (pixel) and the sum of filter coefficients also becomes 10/15=⅔. Hence, the above-described resolution conversion filter condition is satisfied.

[Processing Sequence]

The procedures of resolution conversion processing according to the embodiment will be explained with reference to the flowcharts of FIGS. 2 and 3.

In step S201, a control unit 100 acquires multilevel image data having the resolution N from an image input unit 104, and stores it in a storage unit 102. In step S202, an image processing unit 103 executes image processes such as density adjustment and gamma correction for the input multilevel image data. Then, the process advances to step S203. In step S203, the image processing unit 103 performs dither processing using a predetermined dither pattern, thereby converting the multilevel image data into binary image data.

In step S204, the image processing unit 103 executes resolution conversion processing according to the embodiment for the binary image data, thereby converting the binary image data into multilevel image data having the resolution M. This resolution conversion processing will be described later with reference to FIG. 3. In step S205, the image processing unit 103 executes image processing for the multilevel image data having undergone resolution conversion processing. In step S206, the image processing unit 103 transfers the multilevel image data to the image output unit 105. The image output unit 105 performs print processing by using the multilevel image data acquired from the image processing unit 103.

(Resolution Conversion Processing)

Figure 2:
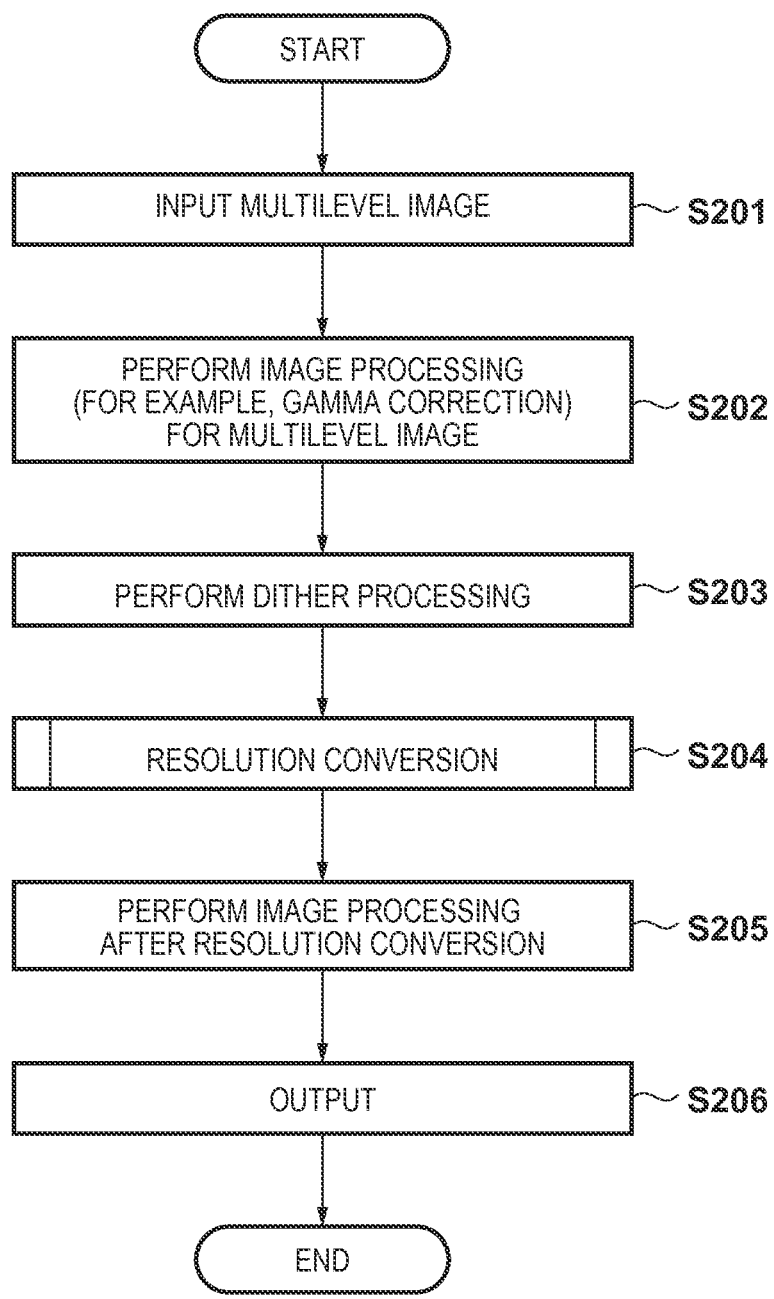
FIG. 2 is a flowchart showing the procedures of resolution conversion processing.
Figure 3:
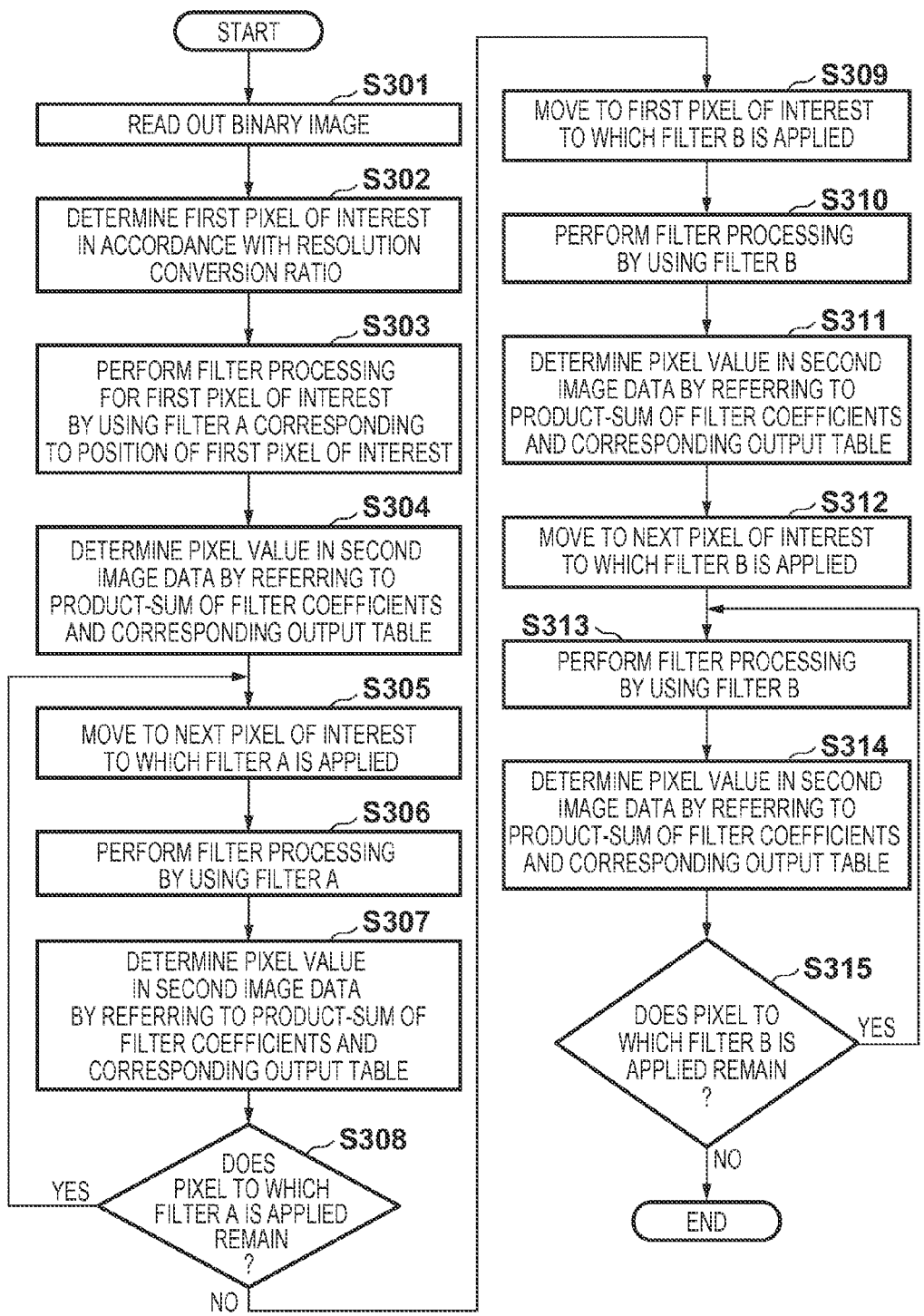
FIG. 3 is a flowchart showing detailed processing procedures in step S205 shown in FIG. 2.

FIG. 3 is a flowchart showing details of the resolution conversion processing in step S204 of FIG. 2. In step S301, the image processing unit 103 reads out binary image data. In step S302, the image processing unit 103 determines, in accordance with the ratio of the first resolution N and second resolution M, the first pixel of interest for which filter processing of resolution conversion processing starts. The first pixel of interest in this step is the first pixel of the line A1 in FIG. 4A, and is a pixel at the left end of the line A1.

In step S303, the image processing unit 103 executes the product-sum operation for the first pixel of interest by using a filter (filter A shown in FIG. 5A) corresponding to the first pixel of interest. In step S304, the image processing unit 103 clips the output result output result of the product-sum operation to 8 bits which are output bits of the second image data.

In step S305, the image processing unit 103 shifts the pixel of interest to the next pixel to undergo the product-sum operation by using the filter A. In step S306, the image processing unit 103 executes the product-sum operation using the filter A for the pixel of interest, similar to step S303. In step S307, the image processing unit 103 clips the output result of the product-sum operation to 8 bits which are output bits of the second image data, similarly to step S304. In step S308, the image processing unit 103 determines whether a pixel to undergo the product-sum operation by using the filter A remains. If there is an unprocessed pixel (YES in step S308), the process returns to step S305, and the image processing unit 103 shifts the pixel of interest to the next pixel to undergo the product-sum operation, and repeats the processing. If there is no unprocessed pixel (NO in step S308), the process shifts to step S309.

In step S309, the image processing unit 103 shifts the pixel of interest to the next first pixel of interest to undergo the product-sum operation by using the filter B (FIG. 5B). The first pixel of interest to which the filter B is applied in this step is the first pixel of the line B1 in FIG. 4A, and is a pixel at the left end of the line B1. In step S310, the image processing unit 103 executes the product-sum operation for the pixel of interest by using the filter B.

In step S311, the image processing unit 103 clips the output result of the product-sum operation to 8 bits which are output bits of the second image data, similarly to step S307. In step S312, the image processing unit 103 shifts the pixel of interest to the next pixel to undergo the product-sum operation by using the filter B. In step S313, the image processing unit 103 executes the product-sum operation using the filter B for the pixel of interest.

In step S314, the image processing unit 103 clips the output result of the product-sum operation to 8 bits which are output bits of the second image data. In step S315, the image processing unit 103 determines whether a pixel to undergo the product-sum operation by using the filter B remains. If there is an unprocessed pixel (YES in step S315), the process returns to step S313, and the image processing unit 103 shifts the pixel of interest to the next pixel to undergo the product-sum operation, and repeats the processing. If there is no unprocessed pixel (NO in step S315), the resolution conversion processing ends.

By the above-described processing, first image data 400 having the first resolution N (600×600 dpi) is converted into second image data 402 having the second resolution M (600× 400 dpi). A non-sampling point in the first image data 400 forms a dot between actual scanning lines by overlay of the sub-dots of upper and lower adjacent sampling points. As a result, a 600-dpi output image can be obtained from an engine having an output resolution of 600×400 dpi.

The control unit 100 according to the embodiment may be implemented in an image processing apparatus such as a controller in a printer main body, or in software such as an application in a host computer such as a PC.

[Comparison with Related Art]

A problem when resolution conversion is performed using a conventional single filter will be described with reference to FIGS. 4A, 7, 8, 9A, and 9B.

Figure 8:
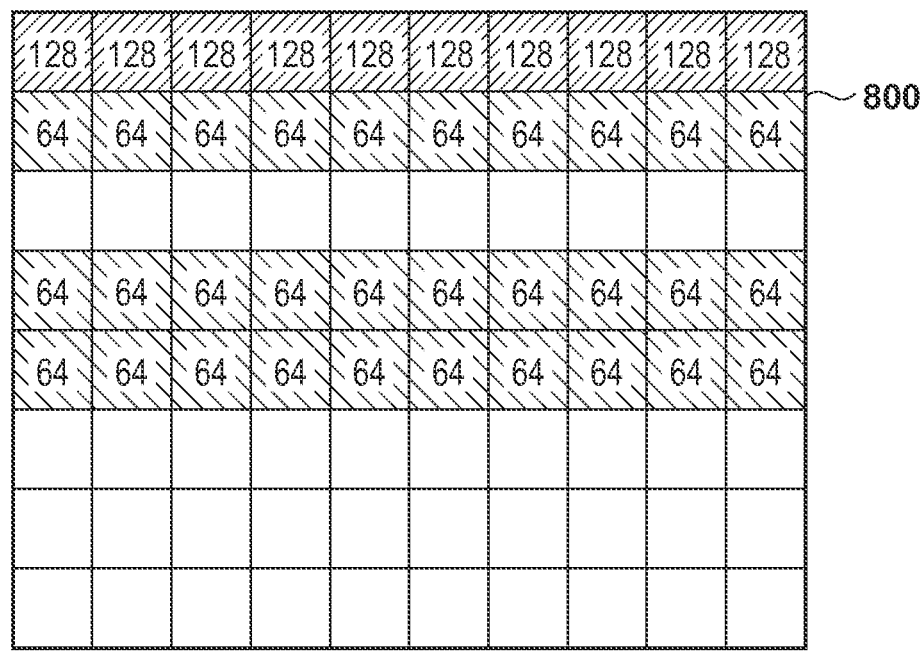
FIG. 8 is a view showing numerical output multilevel image data in conventional resolution conversion processing.

In general, the single filter used in the conventional resolution conversion method has a region centered on a pixel of interest in a direction in which the resolution is converted, and filter coefficients are symmetrical about the pixel of interest. When the input data used in the first embodiment is exemplified, the single filter becomes a filter 701 shown in FIG. 7 because resolution conversion is performed in only the sub-scanning direction. Image data 800 in FIG. 8 represents the result of performing resolution conversion processing by using the single filter for the first image data 400 having the first resolution N.

As represented by the image data 800, values of 128 and 64 are output for the pixels of the first and second lines of the image data 800, respectively, as a result of performing resolution conversion processing for the line A1 of the first image data 400. In addition, a value of 64 is output for the pixels of the fourth and fifth lines of the image data 800 as a result of performing resolution conversion processing for a line positioned between the lines B2 and A3 of the first image data 400. That is, the sums of the output values of pixels of lines positioned between the lines A1, B2, and A3 become different from each other. In this case, the densities and line widths of two lines in the result of a printer output greatly differ from each other, and neither the line width uniformity nor proportion can be maintained.

Figure 9A:
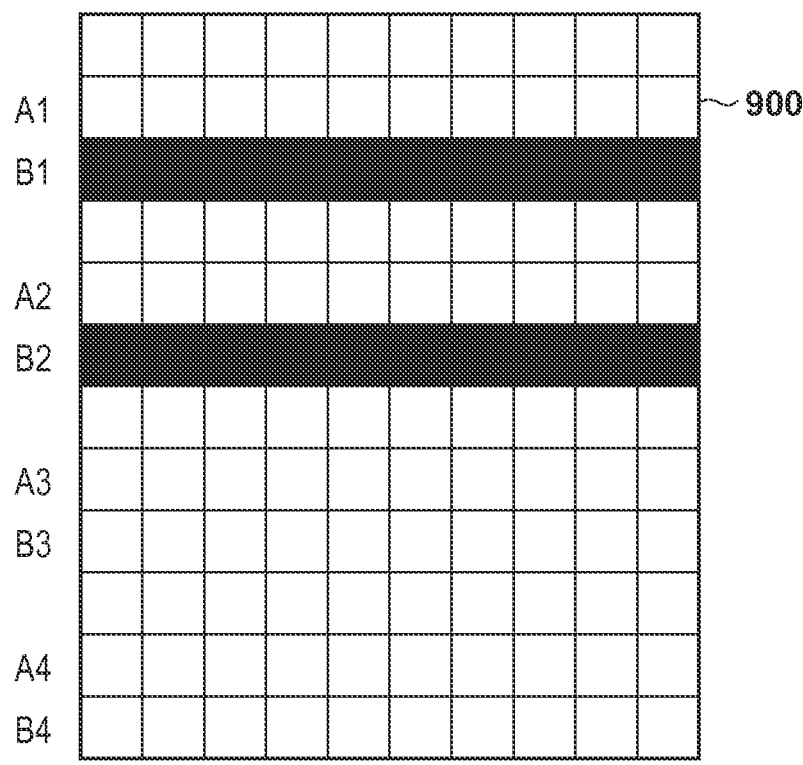
FIGS. 9A and 9B are views showing input binary image data and output multilevel image data in conventional resolution conversion processing.
Figure 9B:
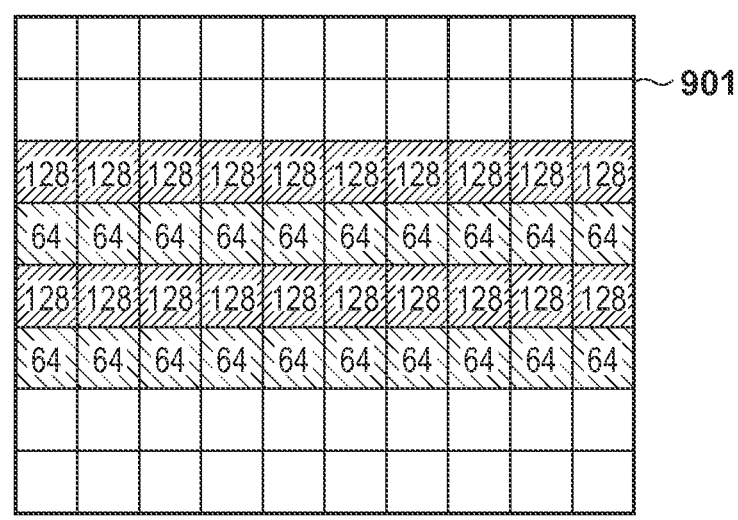

An example in which conventional resolution conversion is executed for first image data 900 having the first resolution N shown in FIG. 9A will be explained. The result after resolution conversion by the conventional method is second image data 901 having the second resolution M shown in FIG. 9B. In FIG. 9A, there are two 600-dpi 1-dot lines as the lines B1 and B2. A space of two dots (two lines) exists between the lines B1 and B2. However, the space between these two lines disappears as a result of conventional resolution conversion processing, as shown in FIG. 9B. This also reveals that the conventional method can maintain neither the line width uniformity nor proportion.

Second Embodiment

The first embodiment has described resolution conversion processing in only the sub-scanning direction. However, the present invention can be used to execute resolution conversion in both the main- and sub-scanning directions. The second embodiment will explain resolution conversion from the first image data having the first resolution of 600 dpi into the second image data having the second resolution of 400 dpi. In both the main- and sub-scanning directions, the resolution is converted from 600 dpi into 400 dpi.

Similar to the first embodiment, resolution conversion processing is first executed for the first image data in the sub-scanning direction. Output multilevel image data is image data 402 shown in FIG. 4C. Since the second embodiment is the same as the first embodiment so far, a description of the processing sequence and operation will not be repeated.

An image processing unit 103 normalizes the output value of the second image data 402 by setting the maximum value of 255 as 1. FIG. 11 shows normalized image data 1100. The image data 1100 is used as the first image data having the first resolution of 600×400 dpi, and resolution conversion in the main-scanning direction into the second image data having the second resolution of 400 dpi is performed. Resolution conversion filters shown in FIGS. 10A and 10B are filters A and B used when executing resolution conversion in the main-scanning direction. More specifically, after resolution conversion processing in the sub-scanning direction, resolution conversion in the main-scanning direction is performed by the same method using the resolution conversion filters shown in FIGS. 10A and 10B.

Similar to the first embodiment, the filter coefficients of the resolution conversion filters in the main- and sub-scanning directions can be adjusted in accordance with the engine characteristic and printer output result. The coefficients can be adjusted independently in the main- and sub-scanning directions.

The second embodiment prepares two types of resolution conversion filters for resolution conversion in the main-scanning direction and resolution conversion in the sub-scanning direction, and executes resolution conversion processing separately. However, resolution conversion processing using four two-dimensional filters as shown in FIGS. 13A to 13D may be executed. This is achieved by switching the four resolution conversion filters in accordance with the positions of sampling points in the main- and sub-scanning directions. These four resolution conversion filters are obtained by integrating the above-described resolution conversion filters in the main- and sub-scanning directions.

Figure 12:
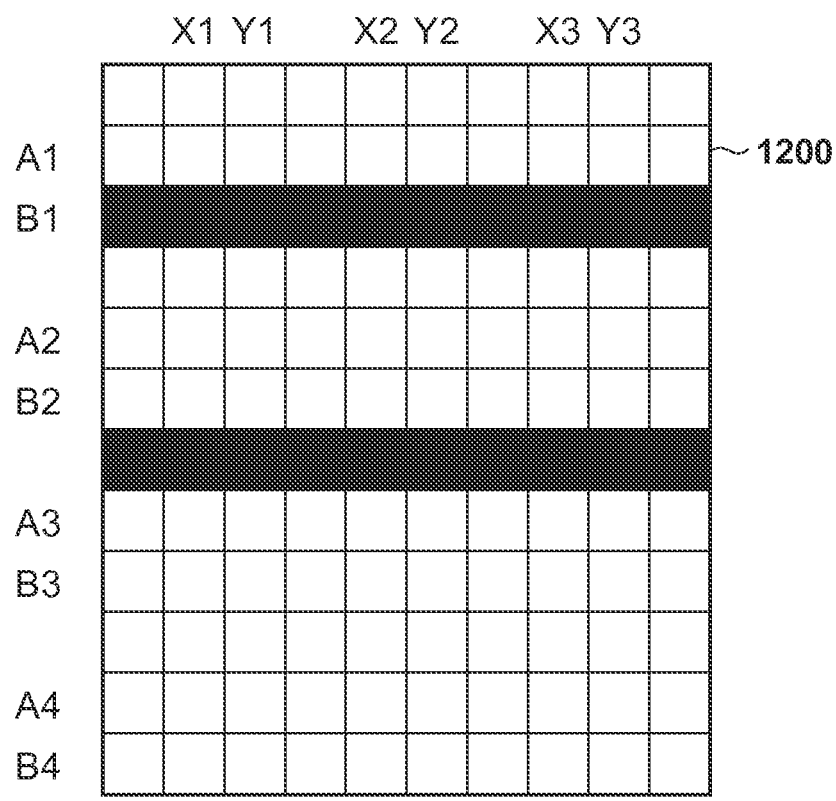
FIG. 12 is a view exemplifying input binary image data.

FIG. 12 shows the first image data having the first resolution of 600 dpi, similar to FIG. 4A, and shows lines X1 to X3 and Y1 to Y3 including sampling points in the main-scanning direction in FIG. 4A. The resolution conversion filter shown in FIG. 13A is used for a point where the lines A1 and X1 intersect each other. The resolution conversion filter shown in FIG. 13B is used for a point where the lines A1 and Y1 intersect each other. The resolution conversion filter shown in FIG. 13C is used for a point where the lines B1 and X1 intersect each other. The resolution conversion filter shown in FIG. 13D is used for a point where the lines B1 and Y1 intersect each other.

An output value is clipped to 8 bits by setting a maximum value of 255, similar to the first embodiment. As a result, the second image data having the second resolution of 400 dpi in both the main- and sub-scanning directions can be obtained.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-238358, filed Oct. 29, 2012, which is hereby incorporated by reference herein in its entirety.

What is claimed is:

1. An image processing apparatus which generates, from first image data having a first resolution, second image data having a second resolution lower than the first resolution, comprising a processor configured to implement:
   a determination unit configured to determine a pixel of interest in the first image data based on a ratio of the first resolution and the second resolution;
   a selection unit configured to select one of a plurality of filters in accordance with a position of the pixel of interest in the first image data that has been determined by the determination unit; and
   a generation unit configured to generate second image data having the second resolution by performing filter processing for a region including the pixel of interest by using the filter selected by the selection unit,
   wherein the ratio of the first resolution and the second resolution is not an integral multiple, and the filter selected by the selection unit is defined by filter coefficients regarding each of the pixel of interest and a pixel other than the pixel of interest included in the region in accordance with the ratio of the first resolution and the second resolution.

2. The apparatus according to claim 1,
wherein the selection unit selects a filter in accordance with a positional relationship between the pixel of interest and a pixel not determined as the pixel of interest by the determination unit.

3. The apparatus according to claim 1,
wherein a ratio of a sum of filter coefficients regarding each of pixels included in a filter selected by the selection unit and a filter coefficient regarding the pixel of interest included in the filter is equal to a ratio of the first resolution and the second resolution.

4. The apparatus according to claim 1,
wherein sums of filter coefficients of the respective filters are equal.

5. The apparatus according to claim 1,
wherein a ratio of a sum of filter coefficients regarding each of pixels included in a filter selected by the selection unit and a sum of filter coefficients regarding a pixel other than the pixel of interest included in the filter is equal to a ratio of the first resolution and the second resolution.

6. The apparatus according to claim 1,
wherein the plurality of filters are defined for resolution conversion processing in a main-scanning direction and resolution conversion processing in a sub-scanning direction, respectively.

7. The apparatus according to claim 1,
wherein the plurality of filters include two-dimensional filters.

8. The apparatus according to claim 1,
wherein the generation unit generates the second image data by performing a product-sum operation using the selected filter for pixels in a predetermined range determined based on the pixel of interest.

9. An image processing method of generating, from first image data having a first resolution, second image data having a second resolution lower than the first resolution, comprising:
   a determination step of determining a pixel of interest in the first image data based on a ratio of the first resolution and the second resolution;
   a selection step of selecting one of a plurality of filters in accordance with a position of the pixel of interest in the first image data that has been determined in the determination step; and
   a generation step of generating second image data having the second resolution by performing filter processing for a region including the pixel of interest by using the filter selected in the selection step,
   wherein the ratio of the first resolution and the second resolution is not an integral multiple, and the filter selected in the selection step is defined by filter coefficients regarding each of the pixel of interest and a pixel other than the pixel of interest included in the region in accordance with the ratio of the first resolution and the second resolution.

10. A non-transitory computer-readable medium storing a program for causing a computer for generating, from first image data having a first resolution, second image data having a second resolution lower than the first resolution, to function as
   a determination unit configured to determine a pixel of interest in the first image data based on a ratio of the first resolution and the second resolution,
   a selection unit configured to select one of a plurality of filters in accordance with a position of the pixel of interest in the first image data that has been determined by the determination unit, and
   a generation unit configured to generate second image data having the second resolution by performing filter processing for a region including the pixel of interest by using the filter selected by the selection unit,
   wherein the ratio of the first resolution and the second resolution is not an integral multiple, and the filter selected by the selection unit is defined by filter coefficients regarding each of the pixel of interest and a pixel other than the pixel of interest included in the region in accordance with the ratio of the first resolution and the second resolution.

* * * * *